J. T. SLOCOMB.
MICROMETER GAGE.
APPLICATION FILED JAN. 5, 1917.

1,269,756.

Patented June 18, 1918.

Inventor:
John T. Slocomb.
By his Attorney
George H. B. Greely

UNITED STATES PATENT OFFICE.

JOHN T. SLOCOMB, OF PROVIDENCE, RHODE ISLAND, ASSIGNOR TO J. T. SLOCOMB COMPANY, OF PROVIDENCE, RHODE ISLAND, A CORPORATION OF RHODE ISLAND.

MICROMETER-GAGE.

1,269,756.      Specification of Letters Patent.     Patented June 18, 1918.

Application filed January 5, 1917. Serial No. 140,681.

*To all whom it may concern:*

Be it known that I, JOHN T. SLOCOMB, a citizen of the United States, residing at Providence, in the county of Providence and State of Rhode Island, have invented certain new and useful Improvements in Micrometer-Gages; and I do hereby declare the following to be a full, clear, and exact description of the invention, such as will enable others skilled in the art to which it appertains to make and use the same.

The present invention relates to micrometer gages, and more particularly to that type of gage in which the measurement is accomplished by the adjustment of a threaded member or spindle in the frame of the gage.

The object of the present invention is to provide a micrometer gage of the above type which not only may be used in the ordinary way for determining dimensions, but which is also adapted for use as a duplicating or limit gage for quickly and accurately determining whether each of a number of pieces are all of the same size as a standard or sample piece or as some fixed dimension, within the predetermined limit of variation.

A further object of the present invention is to provide devices capable of attachment to a common form of micrometer gage to adapt the same for use as a duplicating gage.

With these and other objects in view, as will hereinafter appear, the present invention consists in the devices and combinations of devices hereinafter described and more particularly defined in the claims.

Figure 1:
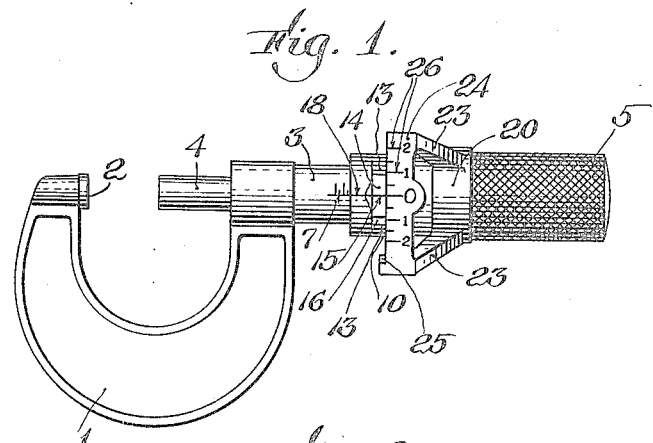
Figure 2:
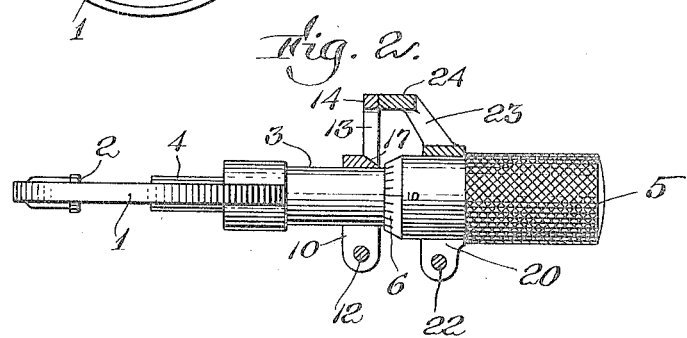
Figure 3:
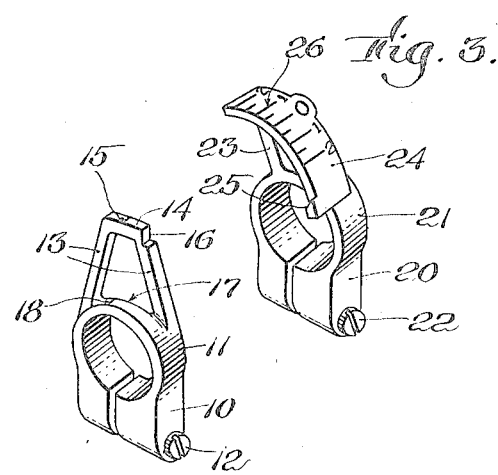

In the accompanying drawings which illustrate what is now considered to be a preferred embodiment of one form of the present invention, Figure 1 is a side elevation of my improved micrometer gage, Fig. 2 is a bottom view with certain portions in section, and Fig. 3 is a perspective view on an enlarged scale of the attachment separate from the gage.

In the specific embodiment of my invention illustrated in the drawings, the U-shaped frame 1 is provided at one end with the anvil 2, and at the other with the barrel or cylindrical extension 3 which is coaxial with the spindle and in which is adjustably mounted the screw threaded spindle 4, having at its outer end the thimble 5. The inner end of the thimble is beveled and provided with the graduations 6 which coöperate with the fixed scale 7 on the barrel or extension 3 of the frame to indicate the adjustment of the spindle, or in other words, the exact distance between the inner end of the spindle and the anvil. The construction thus far described is common and well known.

In the illustrated embodiment of the present invention this common and well known type of micrometer gage has been adapted for use as a duplicating gage by means of an attachment comprising the two members illustrated in Fig. 3 adjustably mounted upon the barrel or extension 3 and the thimble 5 respectively. The member 10 shown comprises a split sleeve 11 adapted to be clamped upon the barrel 3 by means of the screw 12 and having the arms 13 connected at their extremity by the arc-shaped portion 14 concentric with the axis of the spindle and having at its middle the index mark 15, and at one end the recess or abutment 16 for a purpose shortly to be described. Preferably the sleeve is beveled as shown at 17 (see Fig. 2) and provided with the line or mark 18 for reasons hereinafter explained.

The other member 20 also comprises a split sleeve 21 with clamping screw 22. From the sleeve extend the arms 23 which not only diverge, but are inclined to the plane of the sleeve. These arms are connected at their outer ends by the arc-shaped portion 24 which is concentric with the axis of the spindle, and has the same radius as the portion 14, on the member 10. This arc-shaped portion 24 is provided at one end with the shoulder 25 adapted to engage the recess or abutment 16, as hereinafter described. On the outer curved surface of the portion 24 is a scale or series of graduations 26, extending in opposite directions from an intermediate zero point.

When used as a duplicating gage, the zero point on the scale 26 will coincide with the index 15 when the micrometer spindle is adjusted for the exact size of the standard article or the specified dimension, and the two arc-shaped portions will be preferably in light contact. The graduations on the scale 26 will indicate the limits or variation in each direction which have been determined to be permissible for the particular work to be measured or compared. In the micrometer gage shown in the drawing these graduations indicate half-thousandths of an inch, so that if the variation must not be over one half thousandth in each direction, the operator will reject all those pieces which do not measure between the marks 1 on each side of the zero point.

In order to prevent mistakes due to the accidental displacement of the spindle through one or more complete turns, and also to assist in the setting of the instrument, the shoulder and abutment above referred to have been provided which are brought into engagement when the limit of variation in one direction is reached, i. e., two thousandths of an inch smaller than the predetermined or standard measurement. The height of the shoulder 25 is slightly less than the pitch of the micrometer screw, so that the shoulder will pass freely by the arc-shaped portion 14 on the member 10 when the spindle given one turn in the direction to separate the measuring faces of the micrometer, thus enabling the micrometer to be passed over other portions of the work having a greater dimension than the predetermined or standard size, and also to be applied to and removed from the particular part to be measured when it is very much oversize.

By supporting the arc-shaped portions of the members 10 and 20 upon arms which are separated from one another, and which in the case of the member 20 are inclined so that the scale bearing portion is offset axially from the sleeve, and by beveling the sleeve 11, as shown at 17, the operator's view of the scale 7 and graduations 6 is practically unobstructed, thus facilitating the setting of the instrument for any predetermined dimension and the checking of the adjustment at any time.

It will also be observed that owing to the location of the index 15 and scale 26 at a much greater distance from the axis of the spindle than are the scale 7 and graduations 6, the extent of movement of the spindle is magnified, thus not only permitting a finer subdivision of the scale (one-half thousandths as against thousandths on the graduation 6) but also giving a greater distance between adjacent markings. As a result a quicker and more accurate setting and use by the operator are obtained.

It will also be observed that the shoulder 25 forms an automatic stop which, in the specific construction illustrated in the drawings, becomes operative when the limit of two thousandths under the required measurement is reached. This eliminates opportunity for error and prevents the operator from turning the thimble 5 so far to the right as to bring the curved portions 14 and 24 into close contact with the possibility of bending them or forcing them out of adjustment.

The members 10 and 20 are adjusted in the following manner:—Assuming that the micrometer is to be set from a standard piece, the clamping screws 12 and 22 will first be loosened, and the members 10 and 20 pushed well apart. The spindle will then be adjusted upon the standard, and while the spindle is held in this position, the members will be brought together with the zero mark of the scale 26 exactly opposite the index 15 on the member 10, and the clamping screws will be tightened in this position. Preferably the index mark 18 will be substantially over the longitudinal line of the scale 7.

When it is desired to adjust the parts for some exact dimension, say, for .542, a convenient method of setting the instrument is as follows;— The members 10 and 20 are first loosened and pushed apart, after which the micrometer is set in the regular way to indicate .540, that is, two-thousandths less than the desired amount. The member 10 is then moved along the barrel until it is, say, an eighth of an inch from the beveled end of the thimble and is adjusted to bring the mark 18 exactly over the longitudinal line of the index 7 on the barrel. It is then securely clamped by tightening the screw 12. Holding the spindle securely in the position corresponding to .540, the member 20 is pushed along the thimble until the edge of its curved portion 24 comes into contact with the curved portion 14 of the member 10, and the stop 25 engages the abutment 16, whereupon the clamping screw 22 is set tight. When the micrometer is now readjusted to the desired reading, namely, .542, the zero of the scale 26 should be exactly opposite the index mark 15 on the member 10 unless the parts have slipped during the tightening of the screws. If it is not exactly opposite, the clamping screw 22 may be loosened slightly and the member 20 adjusted to the proper extent.

Having thus described the present invention, and explained the principle thereof, and the best mode in which I have as yet contemplated applying that principle, what I claim is:

1. A micrometer gage having, in combination, a frame provided with a cylindrical extension, a micrometer spindle adjustably mounted in the frame co-axially with the cylindrical extension, said frame and spindle being provided one with an index, and the other with a scale coöperating with the index to indicate the standard adjustment of the spindle in the frame, and supplementary devices adjustably mounted one directly upon the spindle, and the other upon the cylindrical extension of the frame for indicating the variations from the standard adjustment of the spindle in the frame.

2. A micrometer gage having, in combination, a frame, a micrometer spindle adjustably mounted in the frame, the frame and spindle being provided with index and scale, and a pair of coöperating members, one normally held in fixed position upon the frame, but adjustable about the axis of the spindle, and the other mounted upon the spindle for indicating variations from a predetermined adjustment of the spindle in the frame.

3. A micrometer gage having, in combination, a frame, a micrometer spindle adjustably mounted in the frame, and a pair of supplementary devices adjustably mounted one on the frame and the other on the spindle and provided one with an index and the other with a coöperating scale graduated in opposite directions from an intermediate point.

4. A micrometer gage having, in combination, a frame, a micrometer spindle adjustably mounted in the frame, a pair of supplementary members adjustably mounted one on the frame and the other on the spindle and provided one with an index and the other with a coöperating scale graduated in opposite directions from an intermediate point, and a stop for limiting the extent of variation.

5. A micrometer gage having, in combination, a frame, a micrometer spindle adjustably mounted in the frame, and a pair of coöperating members mounted upon the frame and spindle respectively, one of said members being provided with a shoulder of less depth axially than the pitch of the micrometer thread and arranged to engage the other member to limit the extent of rotational movement of the spindle in one direction only.

6. A micrometer gage having, in combination, a frame, a micrometer spindle adjustably mounted in the frame, and a pair of members provided with coöperating arc-shaped surfaces having respectively an index and a scale, one of said members comprising a split sleeve offset from said arc-shaped surface and connected therewith by separated arms to facilitate the reading of the micrometer.

7. An attachment for micrometer gages comprising a pair of members each provided with a clamping sleeve adapted to be secured respectively to the frame and to the spindle of the micrometer, one of said members being provided with an index, and the other with graduations to coöperate therewith to indicate variations from a predetermined adjustment of the spindle.

JOHN T. SLOCOMB.

Witnesses:
LILLIAN E. WHITTAKER,
BEATRICE McCLOY.